United States Patent
Riebensahm (10) Patent No.: US 8,968,572 B2
(45) Date of Patent: Mar. 3, 2015

(54) METHOD AND APPARATUS FOR THE PURIFICATION OF WATER CONTAMINATED WITH SULFATE IONS AND WITH HEAVY METAL IONS

(75) Inventor: Michael Riebensahm, Santiago (CL)

(73) Assignee: Siemens Aktiengesellschaft, Munich (DE)

( * ) Notice: Subject to any disclaimer, the term of this patent is extended or adjusted under 35 U.S.C. 154(b) by 1425 days.

(21) Appl. No.: 12/523,977

(22) PCT Filed: Jan. 7, 2008

(86) PCT No.: PCT/EP2008/050090
§ 371 (c)(1),
(2), (4) Date: Jul. 21, 2009

(87) PCT Pub. No.: WO2008/092713
PCT Pub. Date: Aug. 7, 2008

(65) Prior Publication Data
US 2010/0108603 A1    May 6, 2010

(30) Foreign Application Priority Data
Jan. 29, 2007  (DE) .......................... 10 2007 004 310

(51) Int. Cl.
*B01D 21/00* (2006.01)
*C02F 1/52* (2006.01)
(Continued)

(52) U.S. Cl.
CPC .............. *C02F 1/5236* (2013.01); *C02F 1/004* (2013.01); *C02F 1/441* (2013.01)
USPC ........... 210/729; 210/634; 210/638; 210/639; 210/642; 210/649; 210/650; 210/683; 210/688; 210/749; 210/713; 210/714; 210/715; 210/723; 210/724; 210/747.8; 210/747.7; 210/770; 210/806; 210/170.03; 210/170.06; 210/170.07; 210/170.09; 210/170.1; 210/260; 210/262; 210/312; 210/523; 210/525; 210/526; 423/138; 423/150.1; 423/153; 423/544; 423/594.1; 423/594.2

(58) Field of Classification Search
None
See application file for complete search history.

(56) References Cited

U.S. PATENT DOCUMENTS 2,444,671 A * 7/1948 Prager ........................... 210/197
4,046,686 A * 9/1977 Goldstein ..................... 210/638
(Continued)

FOREIGN PATENT DOCUMENTS

DE    3305800 A1    8/1984
DE   19820320 A1   11/1999
(Continued)

OTHER PUBLICATIONS

Vogel (Fermentation and Chemical Engineering Handbook, Second Edition, 1997, p. 251).*
(Continued)

Primary Examiner — Allison Fitzsimmons
(74) Attorney, Agent, or Firm — King & Spalding L.L.P.

(57) ABSTRACT

In a device and a process for purifying water which is contaminated with sulphate ions and heavy metal ions, the water is collected in a water reservoir and a substance having basic activity in water is fed to the water reservoir in such a manner that a precipitant having heavy metal ions is precipitated from the water, wherein at least a subquantity of water is taken off from the water reservoir and is separated into pure water which is substantially freed from sulphate ions and heavy metal ions and dirty water which is enriched with sulphate ions and heavy metal ions. The dirty water is at least in part recirculated to the water reservoir, as a result of which a concentration of sulphate ions in the water reservoir is achieved such that a precipitant having sulphate ions is precipitated from the water.

10 Claims, 3 Drawing Sheets (51) Int. Cl.
*C02F 1/44* (2006.01)
*C02F 1/00* (2006.01)

(56) References Cited

U.S. PATENT DOCUMENTS

| | | |
|---|---|---|
| 4,655,928 A | 4/1987 | Gregor |
| 5,266,210 A | 11/1993 | McLaughlin |
| 5,807,486 A | 9/1998 | Busch, Jr. |
| 5,855,793 A | 1/1999 | Arai |
| 6,036,867 A * | 3/2000 | Jogand et al. ............ 210/696 |
| 6,787,037 B2 | 9/2004 | Rick |
| 6,790,352 B1 | 9/2004 | Overton |

FOREIGN PATENT DOCUMENTS

| | | |
|---|---|---|
| EP | 0622338 A1 | 11/1994 |
| EP | 1293485 A1 | 3/2003 |
| WO | WO 2004103918 A1 | 12/2004 |

OTHER PUBLICATIONS

EPA United States Environmental Protection Agency, Oct. 2006, Management and Treatment of Water from Hard Rock Mines, pp. 1-42.*

Huang Y-C et al., Waste Management, Elsevier, New York, US, Bd. 13, Nr. 5/7, Seiten 481-501, XP000415216, ISSN: 0956-053X; Book; 1993.

International PCT Search Report, PCT/EP2008/050090, 11 pages, Mailed May 8, 2008.

German Office Action, German application No. 10 2007 004 310.6, 3 pages, Mar. 4, 2008.

* cited by examiner

METHOD AND APPARATUS FOR THE PURIFICATION OF WATER CONTAMINATED WITH SULFATE IONS AND WITH HEAVY METAL IONS

CROSS-REFERENCE TO RELATED APPLICATIONS

This application is a U.S. National Stage Application of International Application No. PCT/EP2008/050090 filed Jan. 7, 2008, which designates the United States of America, and claims priority to German Application No. 10 2007 004 310.6 filed Jan. 29, 2007, the contents of which are hereby incorporated by reference in their entirety.

TECHNICAL FIELD

The invention relates to a method and an apparatus for the purification of water contaminated with sulfate ions and with heavy metal ions.

BACKGROUND

The present invention lies in the technical field of water purification or water treatment. Water treatment is nowadays of major importance in many areas of private and commercial life. Statutory environmental regulations and health regulations also increasingly have to be adhered to. The method according to various embodiments and the apparatus according to various further embodiments can be used particularly advantageously in the area of the elimination of acid rock drainage which may occur during the industrial conveyance of raw materials in open cast mining. Acid rock drainage is waste water with a pH value markedly lower than seven, that is to say an acid solution which moreover has, as a rule, heavy metal ions dissolved in the water.

Acid rock drainage arises due to water, for example in the form of rain or snow, which trickles through a waste heap occurring during mining. If soil or conveyed material, for example on an overburden heap, comes into contact with water, for example rainwater or melt water, and air, in particular oxygen, chemical reactions take place, the consequence of which is ultimately the generation of sulfuric acid. The sulfuric acid, when it trickles through the soil or conveyed material, releases heavy metals from the soil or from the dumped conveyed material. Via natural drainages or channels, the, as a rule, heavy metal-containing acidic solution collects in a natural sink or runs, unpurified, into a river.

The water contaminated with sulfate ions and with heavy metals usually has a toxic effect on living organisms. It is therefore necessary and expedient to remove the sulfate ions and the heavy metal ions from the aqueous solution.

SUMMARY

According to various embodiments, an apparatus and a method can be provided by which a technically relatively uncomplicated and cost-effective purification of the water contaminated with sulfate ions and with heavy metal ions is possible.

According to an embodiment, a method for the purification of water contaminated with sulfate ions and with heavy metal ions, the water being collected in a water reservoir, and a substance having a basic action in water being supplied to the water reservoir in such a way that a precipitation substance having heavy metal ions is precipitated out of the water, may comprise the steps of: at least one water part quantity being extracted from the water reservoir and being separated into clean water, essentially freed of sulfate ions and of heavy metal ions, and into dirty water, enriched with sulfate ions and heavy metal ions, and the dirty water being at least partially recirculated into the water reservoir, with the result that a concentration of sulfate ions in the water reservoir is reached, so that a precipitation substance having sulfate ions is precipitated out of the water.

According to a further embodiment, the water and the basically acting substance supplied may be intermixed. According to a further embodiment, the water part quantity can be prefiltered during extraction. According to a further embodiment, the water part quantity can be separated into clean water and dirty water by at least one of means of reverse osmosis and means of nanofiltration. According to a further embodiment, the substance having a basic action in water may be a hydroxide compound. According to a further embodiment, precipitation substance can be collected in a collecting region of the water reservoir. According to a further embodiment, precipitation substance can be discharged continuously from the water reservoir. According to a further embodiment, discharged precipitation substance can be dewatered.

According to another embodiment, an apparatus for the purification of water which is contaminated with sulfate ions and with heavy metal ions which is provided as a water reservoir in a receptacle, may comprise a device for the supply of a substance having a basic action in water into a mixing region of the water reservoir, a device for the extraction of water from the water reservoir, and a filter device for filtering the extracted water into clean water, essentially freed of sulfate ions and heavy metal ions, and into dirty water, enriched with sulfate ions and with heavy metal ions, the dirty water being recirculatable into the water reservoir.

According to a further embodiment, the water extraction may take place in an extraction region of the water reservoir and a mixing of the substance having a basic action in water with water may take place in the mixing region of the water reservoir, an intermixing of water from the extraction region with water from the mixing region being reduced. According to a further embodiment, a device for the mixing of substance may have a basic action in water with water is provided. According to a further embodiment, the water extraction device may have at least one microfiltration element and/or at least one floatation cell. According to a further embodiment, the filter device may comprise at least one nanofiltration stage and/or at least one reverse osmosis filter. According to a further embodiment, the filter device and/or the water extraction device may have a membrane permeable to clean water, a cleaning device for the membrane being provided, a cleaning of the membrane being capable of being brought about by means of a magnetic field. According to a further embodiment, the receptacle may have a collecting region for the collection of precipitation substance having sulfate ions and/or heavy metal ions. According to a further embodiment, the precipitation substance collected in the collecting region can be discharged by means of a discharge device. According to a further embodiment, the discharged precipitation substance can be dewatered by means of a dewatering device. According to a further embodiment, the dewatering device may be designed as a filter press and/or as a band filter. According to a further embodiment, the receptacle can be a catching tank. According to a further embodiment, the receptacle can be a purifying vessel.

BRIEF DESCRIPTION OF THE DRAWINGS

Further advantages of the invention may be gathered from the diagrammatically illustrated exemplary embodiments which are explained in more detail with reference to the following drawings in which.

DETAILED DESCRIPTION

That part of the object which relates to the method is achieved by means of a method for the purification of water contaminated with sulfate ions and with heavy metal ions, the water being collected in a water reservoir, and a substance having a basic action in water being supplied to the water reservoir in such a way that a precipitation substance having heavy metal ions is precipitated out of the water, at least one water part quantity being extracted from the water reservoir and being separated into clean water, essentially freed of sulfate ions and of heavy metal ions, and into dirty water, enriched with sulfate ions and heavy metal ions, and the dirty water being at least partially recirculated into the water reservoir, so that a concentration of sulfate ions in the water reservoir is reached, so that a precipitation substance having sulfate ions is precipitated out of the water.

A water reservoir is understood within the scope of this application to mean a natural and/or artificial receptacle together with the water present in the receptacle.

The method according to various embodiments may be used particularly advantageously for waste water which occurs during the quarrying of raw materials in mines, particularly with sulfur-containing soil. However, the method according to various embodiments is not restricted to such an application. On the contrary, this method may be used in general for water treatment when heavy metal ions and/or sulfate ions are present in the water.

In the method, a substance having a basic action in water is supplied to the contaminated water, in order to raise the pH value of the water in the water reservoir. By the pH value in the water being varied, in particular by oxonium ions being removed from the water, there is a displacement of the chemical equilibrium of the heavy metal ions and hydroxide ions dissolved in the contaminated water. The displacement of the chemical equilibrium by the supply of a substance having a basic action in water, that is to say a hydroxide ion donor or a proton acceptor, brings about a precipitation of a compound having heavy metal ions, usually a heavy metal hydroxide compound.

The concentration of the heavy metal ions dissolved in the contaminated water is reduced due to the precipitation of the precipitation substance having heavy metal ions. The precipitation substance containing heavy metal ions usually sinks down and usually settles at a boundary, for example at the bottom, of the water reservoir. Preferably, the substance having a basic action in water is supplied to the water reservoir continuously.

Advantageously, a water part quantity is extracted from the water reservoir and already has a reduced heavy metal ion concentration which has been reduced by means of the above precipitation reaction. The extracted water part quantity is separated into clean water, which is essentially freed of sulfate ions and of heavy metal ions, and into dirty water, which is enriched with sulfate ions and with heavy metal ions. This takes place, as a rule, by means of a filter device suitable for this purpose.

After the filtration of the water part quantity into clean water and dirty water, the dirty water is recirculated into the water reservoir again. Furthermore, the supply of the substance having a basic action in water takes place preferably in parallel in water. Owing to the increase of the sulfate ion concentration in the dirty water, as compared with the sulfate ion concentration in the water part quantity originally extracted from the water reservoir, the recirculation of the dirty water into the water reservoir leads to a usually continuous rise of the sulfate ion concentration in the water reservoir.

Owing to the water extraction, advantageously carried out continuously, and to the subsequent filtration of the water part quantity into clean water and dirty water, the sulfate ion concentration rises beyond a solubility limit and, in combination with the ions present in the solution, for example calcium ions, if appropriate also heavy metal ions, begins to be precipitated as a sulfate compound and to settle at the boundary of the water reservoir, that is to say of the receptacle. A mixing of precipitation substance having heavy metal ions and of precipitation substance having sulfate ions consequently occurs at the bottom of the water reservoir. It is in this case advantageous that no further substances exceeding the amount mentioned are required for precipitating the heavy metal ions and/or the sulfate ions out of the contaminated water. This is because the quantity of sludge which occurs is thereby kept as low as possible.

The clean water obtained during filtration may, for example, be further utilized, for example as process water or the like, or be introduced into a river.

The method according to various embodiments therefore affords a mixture of a precipitation substance containing heavy metal ions and of a precipitation substance having sulfate ions. The precipitation substance deposited in the water reservoir is usually designated as sludge or slag. The sludge occurring cannot, as a rule, be utilized any further. However, these sludges may preferably be dewatered or dried so that final storage is simplified. In specific instances, a utilization of the sludge having sulfate ions and heavy metal ions is possible, for example in the concrete industry or as a basic material for the production of sulfuric acid.

In an embodiment, the water and the substance supplied to the water and having a basic action in water are intermixed preferably actively. Intermixing leads to an improved distribution of the substance having a basic action in water and, consequently, to an increased reaction rate of the precipitation reaction of the heavy metal ions from the aqueous solution. The intermixing of the water and of the supplied substance having a basic action may be carried out, for example, by means of a mixing device, for example the supply of the substance having a basic action into the water may also be designed in such a way that intermixing is caused essentially by the supply of the basically acting substance into the water, for example due to flow-induced turbulences.

In a further embodiment, the water part quantity is prefiltered during extraction. On account of the precipitation reaction of the heavy metal ions, slowly sinking precipitation substances which usually do not agglomerate are present in the water of the water reservoir. During water extraction and subsequent filtration of the extracted water into clean water and dirty water, these precipitation substances may have a disturbing effect. By the water part quantity being prefiltered during the extraction of this water part quantity from the water reservoir, the situation can be avoided where the finely distributed precipitation substance suspended in the water passes into the filter device and may possibly give rise there to an impairment of the filtering action of the filter device. Prefiltering may be achieved, for example, by means of a microfiltration element or by means of a floatation column.

According to an embodiment, the water part quantity is separated into clean water and dirty water by means of reverse osmosis and/or by means of nanofiltration. Both reverse osmosis and nanofiltration are suitable methods for removing sulfate ions from water. While reverse osmosis utilizes concentration differences between two part volumes separated by a membrane in order to carry out the filtration of ions, nanofiltration provides a membrane through which the ions to be filtered cannot pass due to their size.

According to an embodiment, the substance having a basic action in water is a hydroxide compound. In particular, sodium hydroxide or else calcium hydroxide may be used. These may be supplied to the water reservoir both in dissolved form and in solid form. In particular, calcium hydroxide or milk of lime is available in large quantities and is cost-effective.

According to an embodiment, the precipitation substance is collected in a collecting region of the water reservoir. The precipitation substance, that is to say the precipitation substance having heavy metal ions and the precipitation substance having sulfate ions, is collected at a suitable location in the water reservoir. This may be made possible, for example, by a collecting device. Also, for example, the bottom boundary of the water reservoir may have a funnel-shaped configuration, so that, in the process of the sedimentation of the precipitation substance, an accumulation of precipitation substance in a collecting region provided for this purpose, for example in a funnel, occurs. A collecting device may, for example, also be configured in such a way that, by a specific flow profile being stipulated within the water reservoir, an accumulation of the precipitation substance takes place in a specific region of the water reservoir.

According to an embodiment, the precipitation substance is discharged continuously from the water reservoir. Particularly when the method according to various embodiments is carried out continuously, a continuous precipitation of precipitation substance also occurs in the water reservoir. The result of this is that the receptacle of the water reservoir is in course of time filled with sludge. In order to avoid a displacement of water caused by the sludge and, for example, an escape of water from the water reservoir, it is necessary for the sludge to be removed from the water reservoir. A removal of the sludge from the water reservoir may advantageously be combined with a subsequent dewatering of the sludge.

That part of the object which relates to the apparatus is achieved by means of an apparatus for the purification of water which is contaminated with sulfate ions and with heavy metal ions which is provided as a water reservoir in a receptacle, with a device for the supply of a substance having a basic action in water into a mixing region of the water reservoir, with a device for the extraction of water from the water reservoir and with a filter device for filtering the extracted water into clean water, essentially freed of sulfate ions and heavy metal ions, and into dirty water, enriched with sulfate ions and with heavy metal ions, the dirty water being recirculatable into the water reservoir.

By means of an apparatus according to various embodiments, a water contaminated with sulfate ions and with heavy metal ions can be purified simply and cost-effectively, the mass or volume of occurring or precipitated precipitation substance being kept as low as possible.

According to a further embodiment of the apparatus, the water extraction takes place in the water extraction region of the receptacle and a mixing takes place in the mixing region of the receptacle, an intermixing of the water from the water extraction region with the water from the mixing region being reduced. The mixing region, in which the basically acting substance is supplied to the water, usually has water movement. Moreover, the precipitation reaction of the heavy metal ions which occurs when the basically active substance is supplied leads to the generation of precipitation substances insoluble in the water. These are not desirable in extraction of a water part quantity by means of a water extraction device for subsequent filtering of the water part quantity.

This is because this finely distributed precipitation substance contained in the water may, when coextracted during water extraction, lead to a reduction in the filter action, for example in that a filter element of the filter device becomes clogged with the precipitation substance. Since a mixing of the water from the wash extraction region and of the water from the mixing region is reduced, the occurrence of a problem of this kind can essentially be avoided.

The reduction in the mixing of water from the mixing region with water from the water extraction region may, for example, be achieved by means of a structural shielding of the water extraction region from the mixing region. Alternatively, for example, the water extraction region and the mixing region may be arranged in relation to one another, in particular spaced apart, in such a way that a mixing of the water in the water extraction region with the water in the mixing region is likewise reduced.

Such a measure for reducing the mixing of water from the mixing region and the water from the water extraction region may advantageously be combined with a mixing device for intermixing the substance having a basic action in water with water. The mixing device promotes the distribution of the basically acting substance supplied to the water and thereby increases the reaction rate of the precipitation reaction. The mixing device may, for example, be designed as a circulation pump. At the same time, water extraction is not disturbed or is disturbed to only a slight extent.

According to a further embodiment of the apparatus, the water extraction device has at least one microfiltration element and/or at least one floatation column. The one microfiltration element or the plurality of microfiltration elements filter the water, during the extraction of a water part quantity, in the range of a few micrometers and higher, for example in that precipitated precipitation substance present in the water is retained by pores of corresponding size. In a floatation cell, the precipitation substance present in the water is floated out by means of small gas bubbles, with the result that a prefiltration of the extracted water is likewise achieved. A floatation cell is usually part of the water extraction device, in which the extracted water is prefiltered, and precedes the filter device.

Preferably, the water extraction device comprises a plurality of microfiltration elements which are provided as redundancies and can be used when a blockage of a microfiltration element by means of which water has been extracted occurs.

According to a further embodiment of the apparatus, the filter device comprises at least one nanofiltration stage and/or at least one reverse osmosis filter. These are filter elements having a known behavior during operation, which are suitable for carrying out a filtration of water contaminated with sulfate ions and/or with heavy metal ions into clean water and dirty water.

According to a further embodiment of the apparatus, a cleaning device for a membrane of the filter device and/or water extraction device is provided, a cleaning of the membrane being capable of being brought about by means of a magnetic field. For this purpose, a device for generating a magnetic field is provided, the magnetic field penetrating, for example, through a membrane of a filter device or of a water extraction device in such a way that the sulfate ions filtered or to be filtered by the membrane and located near the membrane experience a force leading away from the membrane, and the amount of the force is so great that the filtered ions are moved away from the membrane.

According to a further embodiment of the apparatus, the receptacle has a collecting region for the collection of precipitation substance having sulfate ions and/or heavy metal ions. This makes it easier, for example, subsequently to clear out the precipitation substance collected in the collecting region. This is because the precipitation substance is thereby concentrated locally and is not distributed far inside the water reservoir.

A collecting region may be made possible, for example, by a suitable structural measure, for example a funnel-shaped bottom of the receptacle, or by influencing a flow profile in the water reservoir. The setting of a specific flow profile may also be utilized to generate an accumulation of precipitation substance in a specific region of the receptacle.

To clear out or to discharge the precipitation substance collected in the collecting region, a discharge device may be provided. The discharge device for discharging the collected precipitation substance may be designed, for example, as a dredger, vacuum appliance or pump. The discharge device is preferably operated in such a way that the discharge of the precipitation substance takes place continuously. Alternatively, the discharge of the precipitated precipitation substance may take place at specific time intervals.

The apparatus according to various embodiments advantageously comprises a dewatering device, by means of which the discharged precipitation substance can be dewatered. In particular, the dewatering device may be designed as a filter press, band filter or heating device. A dewatering of the expelled or discharged precipitation substance reduces the volume of the precipitation substance in that water is driven out of the precipitation substance laden with water and discharged out of the water reservoir. Moreover, final storage of the precipitation substance having heavy metal ions or having sulfate ions is made easier by dewatering.

According to a further embodiment of the apparatus, the receptacle in which the water reservoir is provided is a catching tank. The catching tank may, on the one hand, be a natural sink in which water accumulates. On the other hand, it may be an artificially provided catching tank which has been provided for the purpose of the collection of water, in particular waste water. Where a natural sink is concerned, the term "tailing dam" is usually adopted.

According to a further embodiment of the apparatus, the receptacle is a purifying vessel. That is to say, the purification of the water contaminated with sulfate ions and with heavy metal ions takes place in what is known as a crystallization reactor in which the precipitation substance is precipitated. Here, therefore, the water reservoir is provided, for example, in a purifying vessel of the crystallization reactor for carrying out the method.

Figure 1:
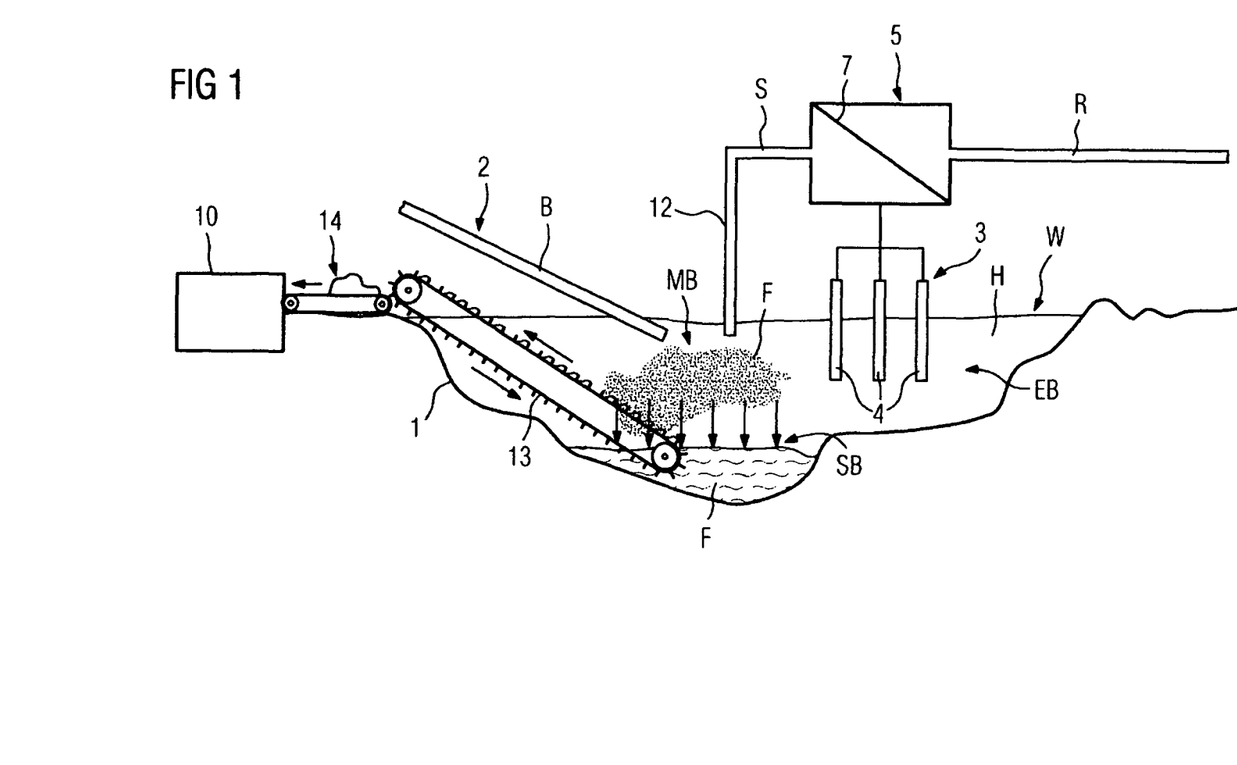
FIG. 1 shows a natural sink with an apparatus according to an embodiment for carrying out the method according to an embodiment.

FIG. 1 shows a water reservoir W. The water reservoir W has water H which is contaminated with heavy metal ions and with sulfate ions and which is provided in a receptacle 1 surrounded by the water reservoir W. In FIG. 1, the receptacle 1 is in the form of a natural sink. In the present case, the water reservoir W is a tailing dam which can be assigned to a mine, for example for the quarrying of metallic raw materials.

In order to make it possible to purify the water H contaminated with heavy metal ions and with sulfate ions by removing the heavy metal ions and sulfate ions, a supply device 2 is provided, by means of which a substance B having a basic action in water—in FIG. 1 lime water, $Ca(OH)_{2(aq)}$—can be supplied to the contaminated water H in the sink 1.

The introduction of the lime water B into the water H contaminated with heavy metal ions and with sulfate ions leads to an increase in the pH value, in that hydroxide ions are supplied to the water. The supply of hydroxide ions results in a displacement of the chemical equilibrium for the heavy metal ions dissolved in the water and their possible salts. The displacement of the chemical equilibrium by the supply of the substance B having a basic action in water can bring about a precipitation reaction of the heavy metal ions. The heavy metal ions dissolved in the contaminated water H are precipitated out of the contaminated water as a precipitation substance F which is often also designated as precipitate. In the present invention, the precipitation substance F is often a heavy metal hydroxide compound.

That region of the water reservoir W at which an intermixing of the lime water B supplied to the contaminated water H with the contaminated water H takes place is designated as the mixing region MB. Particularly in the mixing region MB, the precipitation of the precipitation substance F having heavy metal ions occurs. The precipitation substance F precipitated in the mixing region MB then usually, if there are no water flows opposing the sinking of the precipitation substance F, sinks to the bottom of the sink 1 and accumulates there in a collecting region SB. The term "collecting region SB" may be understood as covering all possible regions at or on which precipitated precipitation substance F settles or is sedimented.

To remove the sulfate ions out of the water H contaminated with heavy metal ions and with sulfate ions, a water extraction device 3 is provided which comprises microfiltration elements 4. The water extraction device 3 is arranged in a water extraction region EB. The microfiltration elements 4 serve for prefiltering the water H extracted from the water reservoir W. In particular, the extracted water H is purified of precipitation substance F suspended in the water H. Alternatively or additionally, a floatation cell, not illustrated, which follows the water extraction may be provided for prefiltering the extracted water H.

The water H extracted by means of the water extraction device 3 is supplied to a filter device 5. In FIG. 1, the filter device 5 comprises a reverse osmosis filter 7. By means of the reverse osmosis filter 7, the water H extracted from the water reservoir W is separated into clean water R and dirty water S. The clean water R is essentially freed of sulfate ions and of heavy metal ions. By contrast, the dirty water S is enriched with heavy metal ions and with sulfate ions.

By means of a recirculation device 12, the dirty water S is conducted from the filter device 5 back into the water reservoir W. Alternatively, a recirculation device 12 may be dispensed with, for example in that the filter device 5 is arranged above the water reservoir W and the dirty water is, for example, recirculated from the filter device 5 into the water reservoir W, without a guide device physically present being provided for the dirty water S.

The dirty water S is preferably introduced into the mixing region MB in which the lime water B for precipitating the heavy metal ions is also introduced.

The sulfate ions contained in the dirty water S cause a rise in the concentration of sulfate ions in the water reservoir W by the dirty water S being recirculated into the water reservoir W. The concentration of sulfate ions is increased by the dirty water S being recirculated into the water reservoir W, until a precipitation of a precipitation substance F containing sulfate ions occurs. The precipitation substance F containing sulfate ions also, as a rule, sinks to the bottom of the tailing dam 1. An intermingling of precipitation substance F containing sulfate ions and heavy metal ions therefore occurs on the bottom of the tailing dam.

In order to prevent an increasing filling of the water reservoir W or of the sink 1 with precipitated and accumulated precipitation substance F, a discharge device 13 is provided which is designed in FIG. 1 as a dredger. The dredger 13 is preferably configured in such a way that a continuous discharge of precipitated precipitation substance F is possible. Alternatively, it may, for example, also be a bucket excavator 13 which does not dig away continuously and, for example after the draining of the water reservoir W, strips away the precipitation substance F which has settled in the sink 1.

Subsequently, the precipitation substance F discharged by means of the dredger 13 is conveyed onto a conveyer belt 14 which transports the precipitation substance F laden with contaminated water into a dewatering device 10.

In the dewatering device 10, which is designed in FIG. 1 as a filter press, a dewatering of the precipitation substance F discharged from the water reservoir W or the tailing dam takes place. After the dewatering of the precipitation substance F, as a rule, a final storage of the dewatered sludge is provided.

The contaminated water occurring, where appropriate, during the dewatering of the precipitation substance F laden with water may be supplied anew to the water reservoir W for purification.

The apparatus shown in FIG. 1 is particularly suitable for the purification of large water volumes. The purifying apparatus shown in FIG. 1 is preferably operated continuously. This is because contaminated water H is constantly supplied anew to the tailing dam or the water reservoir W by natural inflows—rain, melt water or the like. It is therefore expedient to provide a continuous operation of the apparatus shown in FIG. 1.

Figure 2:
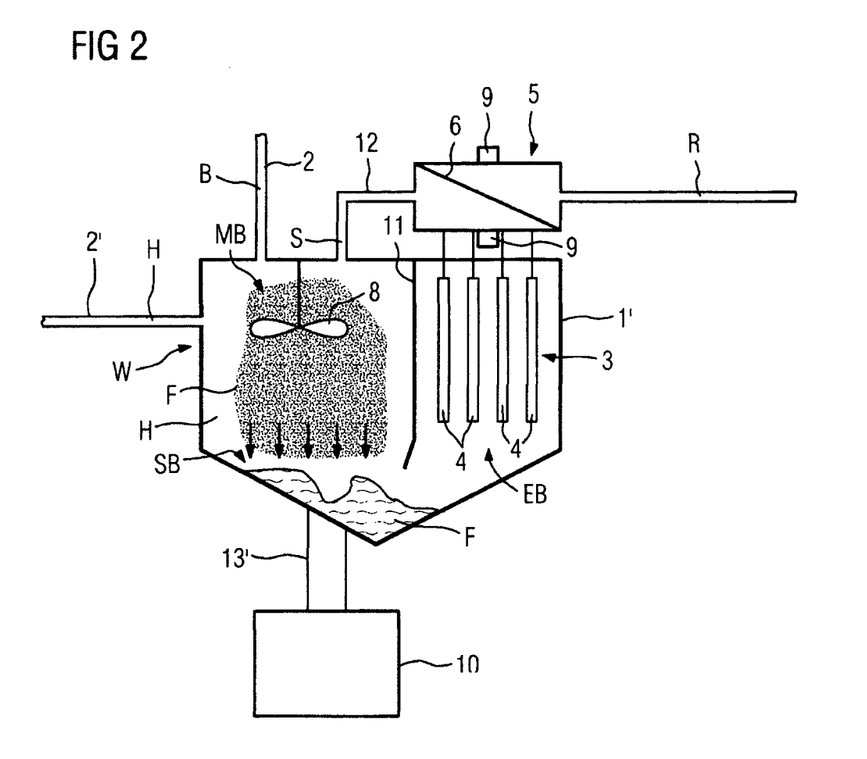
FIG. 2 shows an apparatus according to an embodiment, designed as a crystallization reactor, for carrying out the method according to an embodiment.

FIG. 2 shows a recrystallization reactor for the purification of water H contaminated with heavy metal ions and with sulfate ions. For this purpose, contaminated water H is supplied via a water supply device 2' to a receptacle 1', designed as a purifying vessel, of the recrystallization reactor and may be extracted, for example, from a tailing dam. The purifying vessel 1', together with the contaminated water H contained in it, forms a water reservoir W.

Furthermore, a supply device 2 for the supply of a substance B having a basic action in water—lime water in FIG. 2—into the contaminated water H located in the purifying vessel 1' is provided. The region in which the lime water B is mixed with the contaminated water H located in the recrystallization reactor is designated as the mixing region MB.

In order to improve an intermixing of contaminated water H with the lime water B, a mixing device 8 designed as a circulation pump is provided in FIG. 2. The circulation pump 8 intermixes the lime water B with the contaminated water H by generating a turbulent flow at least in a part region of the water reservoir W, in particular in the mixing region MB.

The supply of the lime water B into the contaminated water H located in the purifying vessel 1' causes a rise in the pH value of the contaminated water H. Owing to the rise in the pH value and the associated displacement of the chemical equilibrium for the heavy metal ions, and the salts possible from these, which are present, dissolved, in the contaminated water, together with the starting materials present in the contaminated water, a precipitation substance F is precipitated.

The precipitation substance F is usually a heavy metal hydroxide compound and gypsum, $CaSO_4$. The precipitation substance F sinks to the bottom of the purifying vessel 1' in FIG. 2.

To improve the collection of the precipitation substance, the bottom of the purifying vessel 1' is of funnel-shaped design in FIG. 2. This is designated in FIG. 2 as the collecting region SB, since the precipitation substance F preferentially accumulates in the funnel of the purifying vessel 1'.

The purifying vessel 1' has, in addition to the mixing region MB and the collecting region SB, a water extraction region EB. The water extraction region EB is separated from the mixing region MB by a separating device 11. A water extraction device is arranged in the water extraction region EB. The water extraction device 3 comprises a plurality of microfiltration elements 4 which, during water extraction, carry out a prefiltration of the contaminated water H. In particular, suspended particles, for example precipitation substance F suspended in the contaminated water H, are selected during water extraction.

The useful life of the microfiltration elements 4 is increased by means of the separating device 11, since the concentration of suspended precipitation substance F in the extraction region EB is reduced, as compared with an absent separating device 11. A blockage rate for the microfiltration elements 4 is therefore lower. Maintenance times and maintenance costs of the water extraction device 3 consequently fall.

The contaminated extracted water H is supplied from the water extraction device 3 to a filter device 5. By means of a nanofiltration stage 6 surrounded by the filter device 5, the contaminated and extracted water H is separated into clean water R and into dirty water S. The clean water R is essentially freed of sulfate ions and of heavy metal ions. In contrast, the dirty water R is enriched with sulfate ions and with heavy metal ions. The enrichment or depletion of ions can be determined as the ratio of the concentration of the respective ions in the clean water or dirty water and of the respective ions in the water supplied to the filter device 5.

By means of a recirculation device 12, the dirty water S is guided out of the filter device 5 back into the water reservoir W. By the dirty water S being recirculated into the water reservoir W, there is predominantly a rise in the sulfate ion concentration in the water reservoir W, particularly, in an apparatus according to FIG. 2, a rise in the sulfate ion concentration in the mixing region MB. The local increase in concentration of the ions to be precipitated is advantageous since the precipitation substance having sulfate ions and the precipitation substance having heavy metal ions accumulate essentially in the same collecting region SB.

Alternatively, however, the dirty water S may, for example, also be supplied in the water extraction region EB. The inflow of the dirty water S in the water extraction region EB of the water reservoir W may in this case be configured in such a way that suspended particles in the contaminated water H are kept away from the microfiltration elements 4 to an increased extent. This takes place, for example, by adapting the flow conditions.

The continuous supply of dirty water S enriched with sulfate ions into the mixing region MB results in the overshooting of the solubility limit of sulfate ions present in the water and in the salts possible from the starting materials present in the contaminated water.

As a rule, the precipitation substance F will comprise calcium sulfate, potassium sulfate, if appropriate also heavy metal sulfate, and will collect by sinking in the funnel-shaped collecting region SB of the purifying vessel 1'.

In order to prevent the purifying vessel 1' from filling up with precipitated precipitation substance F, a discharge device 13' is provided which is designed as a vacuum appliance in FIG. 2. The vacuum appliance 13' periodically or continuously sucks away the precipitation substance F which is accumulated in the collecting region SB of the purifying vessel 1'. The precipitation substance F sucked away is then supplied to a dewatering device 10 which dewaters the water-laden precipitation substance F. The contaminated water which, where appropriate, in this case occurs may be supplied anew to the purifying vessel 1'.

The clean water R which can be generated by means of the cleaning apparatuses shown in FIG. 1 and FIG. 2 has a degree of purity which makes it possible to introduce the clean water into a body of water, for example, without any infringement of environmental regulations. Alternatively, any other desired utilization of the clean water may be provided.

If appropriate, the purifying vessel 1' may also be designed with a very small volume, for example as a microreaction reactor, so that a method according to various embodiments can also be employed in process engineering, in particular process microengineering.

The filter device 5, which utilizes a nanofiltration stage 6 in order to separate the contaminated water H extracted from the purifying vessel 1' into dirty water S and clean water R, has a cleaning device 9. This cleaning device 9 is designed in such a way that a permeability to clean water R of a membrane used by the nanofiltration stage 6 is essentially adjustable.

In particular, a cleaning of the membrane can take place by means of the cleaning device 9.

This is achieved in that the cleaning device 9 comprises means for generating a magnetic field. The magnetic field generated by the means provided for this purpose penetrates through the nanofiltration stage 6, particularly the membrane, and removes from the vicinity of the membrane or from the membrane the ions which are to be filtered by the membrane and are arranged near the membrane or which are already filtered by the membrane.

Figure 3:
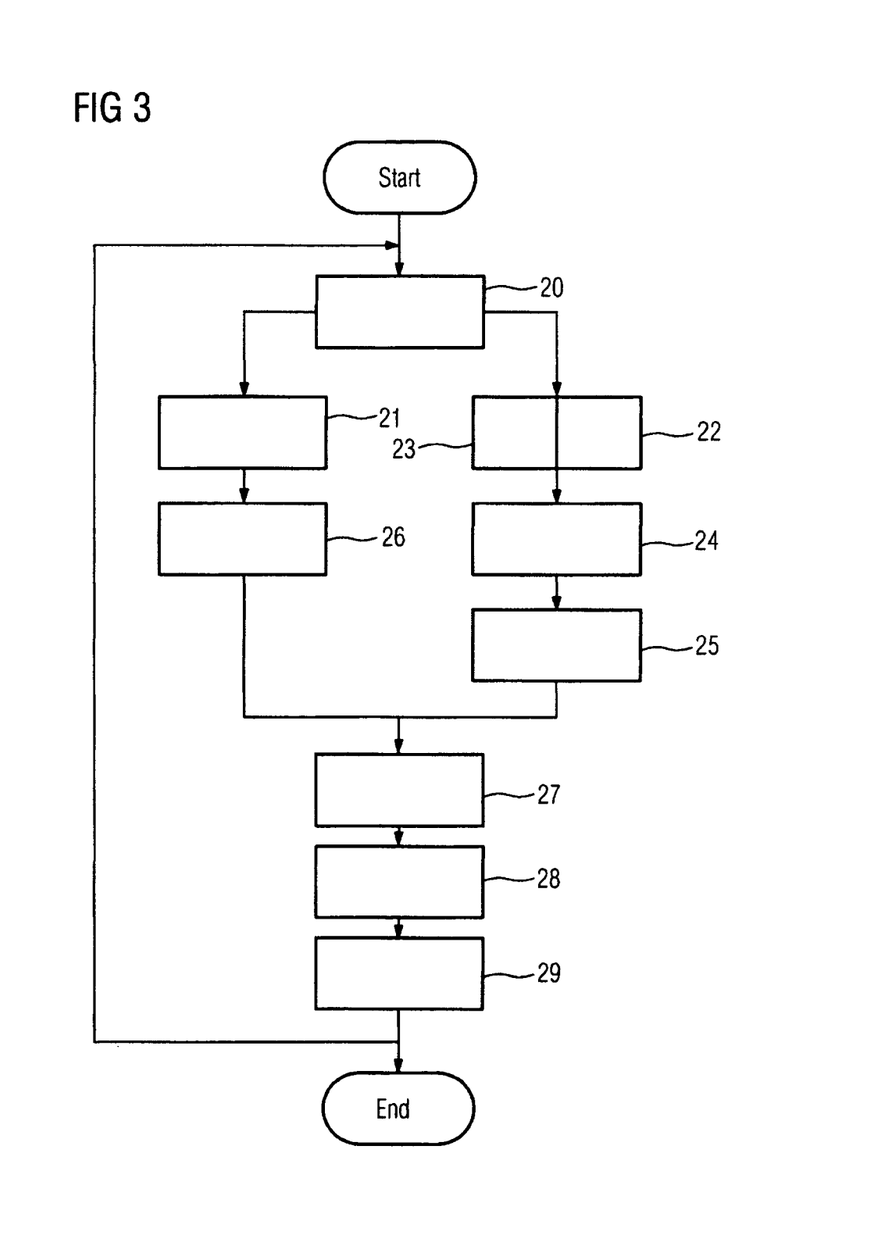
FIG. 3 shows a flow chart for illustrating a possible sequence of the method according to an embodiment.

FIG. 3 shows a flow chart of a method which is suitable for purifying water contaminated with heavy metal ions and with sulfate ions. In a first method step 20, water contaminated with sulfate ions and with heavy metal ions is provided, which is to be purified by means of the method according to various embodiments.

To precipitate or to remove the heavy metal ions from the contaminated water, lime water, milk of lime, caustic potash solution, caustic soda solution or another substance having a basic action in water is first supplied to the contaminated water in a method step 21. The basically acting substance supplied to the water is preferably intermixed with the water in a method step 26 by means for mixing the water or a water mixing device.

As a result of the intermixing, the reaction rate of the substance having a basic action in water is increased by the heavy metal ions, and an improved precipitation of the heavy metal ions out of the contaminated water occurs. The mixing of the substance having a basic action in water with the contaminated water may take place, for example, by agitating or shaking or by means of a suitable introduction of the substance having a basic action in water and of the contaminated water into common mixing zones.

Contaminated water is extracted by means of a water extraction device in a method step 22 preferably in parallel with the supply of the substance having a basic action in water into the contaminated water. The extraction of the water is preferably coupled with a prefiltration of the extracted contaminated water in a method step 23. The method step 22 of water extraction and the method step 23 of prefiltration preferably take place essentially in common.

The water extracted in the method step 23 is then supplied to a filter device in which the contaminated water is separated into clean water and dirty water in a method step 24. Known filter concepts may be used in order to separate the contaminated water into clean water and dirty water. As an example, reverse osmosis or nanofiltration may be mentioned. However, other filter concepts may also be used.

The dirty water enriched with sulfate ions and, where appropriate, with heavy metal ions is supplied to the water reservoir again in a method step 25. This results in an increase in the concentration of sulfate ions in the water reservoir. The sulfate ion concentration rises until a limiting concentration just still soluble in water is overshot and, when this is overshot, a precipitation reaction commences.

Alternatively, the supply of the substance having a basic action in water into the contaminated water and the precipitation reaction thereby triggered may take place before water extraction in method step 22. In this case, the substance having a basic action in water is supplied to an extent which makes it possible initially to free the heavy metal ions essentially completely from the water reservoir.

Since the heavy metal ions are precipitated by means of the substance having a basic action in water, before water extraction takes place in method step 22 and a subsequent filtration of the water then essentially no longer having any heavy metal ions takes place in method step 24, the degree of purity of the clean water, that is to say the concentration of heavy metal ions in the clean water, may, if appropriate, be reduced even further. As a rule, such a serial sequence of the abovementioned method steps is expedient when new contaminated water is not supplied constantly or continuously to a water reservoir having water to be purified.

The precipitation substances usually generated as a result of various precipitation reactions generally collect at the bottom of a receptacle. However, an active collection of precipitation substance can also be provided in a method step 27. Active collection may take place, for example, by means of the shape of the receptacle or, for example, by the generation of a flow profile suitable for the collection of precipitation substance at a specific location. If appropriate, a collecting device may be provided which actively accumulates the precipitated precipitation substance, for example a sweeping device or brushing device.

In a method step 28, the collected precipitated substance is then discharged from the receptacle and is subsequently dewatered in a method step 29. The dewatered precipitation substance can then be finally stored, for example in a shut-down mine.

Preferably, the method with the method steps specified, particularly with regard to a purification of mine waste water, is carried out continuously. That is to say, the delivery of a substance having a basic action in water into the contaminated water, the discharge of precipitated precipitation substance out of a collecting region and water extraction and also subsequent filtration take place in parallel. As a rule, therefore, as high a throughput of contaminated water as possible can be purified.

What is claimed is:

1. A method for the purification of water contaminated with sulfate ions and with heavy metal ions, the method comprising:

collecting water that accumulates in a natural water reservoir via natural drainage, the collected water being contaminated by sulfate ions and heavy metal ions via contact with the natural water reservoir;

supplying to the natural water reservoir a substance that interacts with contaminants in the natural water reservoir to form a first precipitation substance comprising heavy metal;

extracting from the natural water reservoir water containing the first precipitation substance and filtering the extracted water into clean water having reduced sulfate ions and heavy metal ions, and dirty water enriched with sulfate ions and heavy metal ions;

at least partially recirculating the dirty water back into the natural water reservoir wherein the recirculated dirty water mixes with water that was not extracted from the natural water reservoir to provide a concentration of sulfate ions in the natural water reservoir that forms a second precipitation substance comprising sulfate that settles by gravity into a collecting region formed at the bottom of the natural water reservoir; and physically removing at least a portion of the second precipitation substance out through the top of the collecting region of the natural water reservoir.

2. The method according to claim 1, comprising intermixing of contaminants in the natural water reservoir with the supplied substance.

3. The method according to claim 1, further comprising prefiltering the extracted water using a prefiltering device.

4. The method according to claim 1, wherein the extracted water is filtered into clean water and dirty water by at least one of reverse osmosis and nanofiltration.

5. The method according to claim 1, wherein the substance supplied to the natural water reservoir is a hydroxide compound.

6. The method according to claim 1, wherein the second precipitation substance is removed continuously.

7. The method according to claim 1, further comprising dewatering of the second precipitation substance physically removed from the natural water reservoir.

8. The method according to claim 1, wherein the second precipitation substance is removed discontinuously.

9. The method according to claim 1, wherein filtering the extracted water is performed using a filtering device that uses reverse osmosis or nanofiltration, and wherein the method further comprises cleaning the filtering device using a magnetic field.

10. The method according to claim 3, further comprising cleaning the prefiltering device using a magnetic field.

* * * * *